M. N. McDONOUGH.
PIPE COUPLING.
APPLICATION FILED JUNE 6, 1918.
1,290,613.
Patented Jan. 7, 1919.
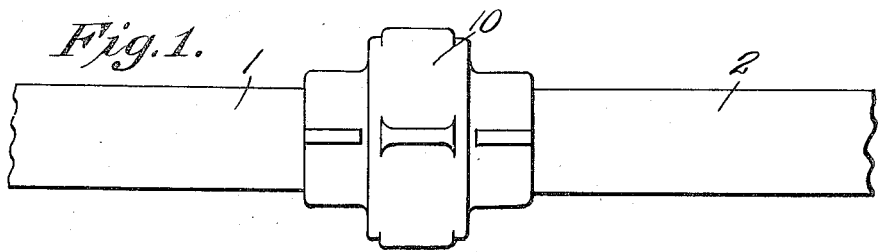
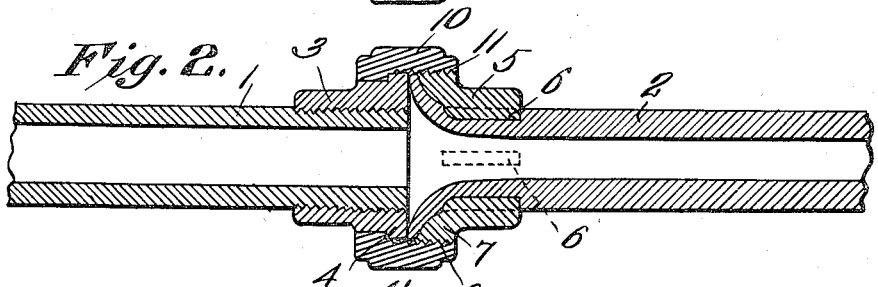
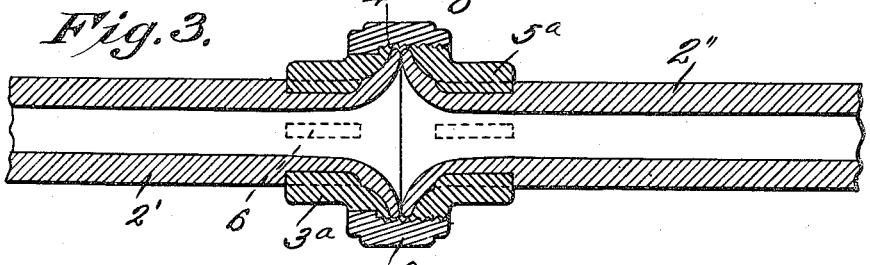
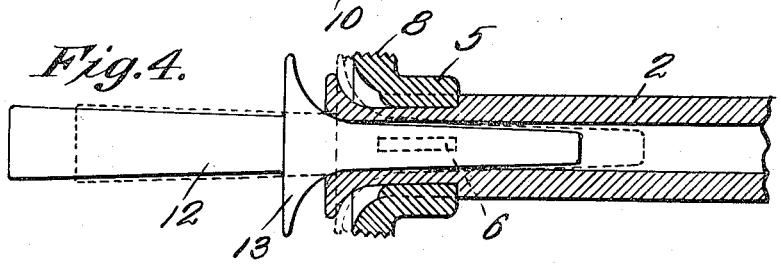
INVENTOR
Martin N. McDonough,
WITNESSES
James F. Crown,
S. M. McColl,
BY Richard B. Owen,
ATTORNEY

UNITED STATES PATENT OFFICE.

MARTIN N. McDONOUGH, OF PITTSBURGH, PENNSYLVANIA.

PIPE-COUPLING.

1,290,613. Specification of Letters Patent. Patented Jan. 7, 1919.

Application filed June 6, 1918. Serial No. 238,539.

*To all whom it may concern:*

Be it known that I, MARTIN N. MC-DONOUGH, a citizen of the United States, residing at N. S. Pittsburgh, in the county of Allegheny and State of Pennsylvania, have invented certain new and useful Improvements in Pipe-Couplings, of which the following is a specification.

This invention relates to pipe couplings for joining the ends of lead pipe sections or a lead and a brass or other hard metal sections.

The object of the invention is to provide a coupling of this character which will connect such sections fluid tight without the use of gaskets or packings.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of two pipes connected by this improved coupling, Fig. 2 is a longitudinal section thereof showing a hard metal and a pliable metal pipe connected thereto, Fig. 3 is a longitudinal section showing the ends of two soft metal pipes connected by this improved coupling, and Fig. 4 is a similar view showing a drift pin in the act of spreading the pliable pipe end to force it into engagement with one of the coupling members.

In the embodiment illustrated in Figs. 1 and 2 a hard metal pipe 1 of iron, brass or the like is shown connected to a pliable metal pipe 2, preferably composed of lead.

The coupling constituting this invention shown in these figures comprises a sleeve 3 internally threaded to engage the threaded end of the hard metal pipe 1 as shown in Fig. 2 and which is provided on its outer face adjacent its meeting end with an annular shoulder 4 which is designed to have swiveled engagement with a connecting collar 10.

The other member 5 of the coupling is in the form of a sleeve provided on its inner face with a plurality of longitudinally extending peripherally spaced ribs 6, their outer ends terminating at points spaced inwardly from the ends of the pipes sections to be connected and which are preferably of a length corresponding to the length of the cylindrical portion of the sleeve 5. This sleeve 5 has its meeting end flared on its inner face as shown at 7, said flared end being threaded exteriorly for engagement with the connecting collar 10 and being of a diameter corresponding to the diameter of the shoulder or flange 4 carried by the sleeve 3. The collar 10 has one end thereof internally threaded as shown at 11 for engagement with the threads 8 on the flared end of the sleeve 5 so that when said collar is engaged with said sleeve and turned in the proper direction it will draw the two sleeves 3 and 5 toward each other and clampingly connect between them the flared end of the pliable metal pipe 2 which is fitted within the flared portion of the sleeve 5 by means now to be described.

In the use of this device, the coupling 3 is first screwed on to the end of the hard metal pipe 1 and the collar 10 is slipped over said pipe in to the position shown in Fig. 2. The sleeve 5 is then placed over the end of the soft metal pipe 2 with the end of the pipe arranged flush with the end of the sleeve. A drift pin 12 having a bell shaped spreading member 13 arranged intermediately of its ends is then inserted in the pipe 2 and forced inwardly by driving or otherwise (see Fig. 4), the head 13 causing the pipe end to spread into engagement with the sleeve 5. This forcing of the drift pin into the pipe 2 also causes the ribs 6 on the inner face of the sleeve 5 to embed themselves into the soft metal of pipe 2 and thus prevents all possibility of the sleeve 5 turning on said pipe. When this sleeve has been so connected with the pipe end 2, the collar 10 is screwed on to the threaded end of the sleeve 5 thereby drawing the two sleeves toward each other and clamping the soft metal pipe end between their meeting faces so that a fluid tight joint is formed without the use of any gaskets or other packings as is shown clearly in Fig. 2.

In the form shown in Fig. 3, the coupling is used to connect the ends of two soft metal pipes 2' and 2''. In this form the sleeve 3ª is similar to the sleeve 3 of the other figures except that its inner face is ribbed as shown at 6' similar to the sleeve 5 of the other figures, and its outer face has an annular flange 4' similar to the flange 4 of Figs. 1 and 2 to provide for the swiveled connection with the sleeve of the collar 10 which is the same as in the form above described. The sleeve 5ª is exactly the same as sleeve 5 and hence it will not be described in detail.

In the use of this form of the invention, two soft metal pipes are inserted in the sleeves 3ª and 5ª and fixedly connected therewith by forcing into them the drift pin shown in Fig. 4 in the same manner above described for connecting the sleeve 5 to the pipe end 2. After these sleeves 3ª and 5ª have been so connected on their respective pipes the collar 10 is engaged with the sleeve 3ª having the swiveled connection therewith and then threaded on to sleeve 5ª thus forcing the two sleeves toward each other and clampingly connecting the two ends of the pipes 2' and 2" between the sleeve ends forming a fluid tight joint between the ends of the pipe without the use of gaskets or packings.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the claimed invention.

Having thus fully described my invention, what I claim as new and desire to secure by Letters Patent, is:

1. In a pipe coupling, the combination with two pipe ends to be connected, one of which is pliable, of sleeves for connection with said pipe ends, the sleeve engaged with said pliable pipe end being provided on its inner face with a plurality of longitudinally extending spaced ribs terminating short of the ends of said sleeve and adapted to be embedded in the outer face of the pipe end, the meeting end of said sleeve being flared on its inner face and threaded exteriorly, and a collar having swiveled connection with the other sleeve and threaded engagement with the flared sleeve.

2. A pipe coupling comprising a pair of sleeves for engagement with the ends of pipes to be connected, one of said sleeves having an annular collar on its periphery at its meeting end and the other exteriorly threaded, and a collar having swiveled engagement with the flanged sleeve and interiorly threaded for connection with the threaded end of the other sleeve, one of said sleeves having radial projections on its inner face adapted to be embedded on the pipe end to be connected.

3. The combination with two pliable pipe ends to be connected, of sleeves having radial projections on their inner faces adapted to be embedded in the periphery of the ends to be connected, said sleeves having their meeting ends flared on their inner faces into which the ends of the pipe to be connected are fitted, and a collar swiveled on one sleeve and having threaded engagement with the other whereby said sleeves are drawn together to clampingly engage the ends of the pipe to be connected.

In testimony whereof I affix my signature in presence of two witnesses.

MARTIN N. McDONOUGH.

Witnesses:
 EDWARD T. FLANNIGAN,
 F. McDONOUGH.